United States Patent
Matsumoto et al.

(10) Patent No.: US 9,017,896 B2
(45) Date of Patent: Apr. 28, 2015

(54) FUEL CELL SYSTEM HAVING FUEL CELL BOX AND VENTILATION DEVICE

(75) Inventors: Mitsunori Matsumoto, Wako (JP); Kazunori Fukuma, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 320 days.

(21) Appl. No.: 13/564,721

(22) Filed: Aug. 2, 2012

(65) Prior Publication Data

US 2013/0034795 A1 Feb. 7, 2013

(30) Foreign Application Priority Data

Aug. 3, 2011 (JP) ................................. 2011-169826

(51) Int. Cl.
| | |
|---|---|
| *H01M 8/04* | (2006.01) |
| *H01M 8/24* | (2006.01) |
| *B60L 11/18* | (2006.01) |
| *B60L 1/00* | (2006.01) |
| *H01M 8/10* | (2006.01) |

(52) U.S. Cl.
CPC ......... *H01M 8/2475* (2013.01); *B60L 11/1898* (2013.01); *H01M 8/04201* (2013.01); *H01M 8/0444* (2013.01); *H01M 8/04664* (2013.01); *H01M 8/04746* (2013.01); *H01M 2250/20* (2013.01); *B60L 1/003* (2013.01); *B60L 11/1892* (2013.01); *B60L 11/1896* (2013.01); *Y02E 60/50* (2013.01); *Y02T 90/34* (2013.01); *Y02T 90/32* (2013.01); *H01M 2008/1095* (2013.01)

(58) Field of Classification Search
None
See application file for complete search history.

(56) References Cited

U.S. PATENT DOCUMENTS

2009/0017745 A1* 1/2009 Kum et al. ............... 454/156
2010/0266876 A1* 10/2010 Yamamoto ................ 429/7

FOREIGN PATENT DOCUMENTS

| CN | 101342863 | 1/2009 |
|---|---|---|
| JP | 2003-132916 | 5/2003 |
| JP | 2004-192889 | 7/2004 |
| JP | 2004-253259 | 9/2004 |
| JP | 2004-311242 | 11/2004 |
| JP | 2005-235635 | 9/2005 |
| JP | 2006-73392 | 3/2006 |
| JP | 2006-147151 | 6/2006 |
| JP | 2006-252919 | 9/2006 |
| JP | 2009-16220 | 1/2009 |

OTHER PUBLICATIONS

Chinese Office Action for corresponding CN Application No. 201210230582.3, Apr. 2, 2014.

* cited by examiner

*Primary Examiner* — Ula C Ruddock
*Assistant Examiner* — Tony Chuo
(74) *Attorney, Agent, or Firm* — Mori & Ward, LLP

(57) ABSTRACT

An fuel cell system includes a fuel cell, a fuel cell box, a ventilation device, an air intake duct, and a gas outlet pipe. The fuel cell is disposed in the fuel cell box. The ventilation device is provided to supply air to the fuel cell box. The air intake duct connects the ventilation device to the fuel cell box to supply air from the ventilation device into the fuel cell box. The gas outlet pipe is connected to the air intake duct and connects an inside space of the fuel cell box to an outside space of the fuel cell box through the air intake duct. The gas outlet pipe has an opening cross-sectional area smaller than an opening cross-sectional area of the air intake duct.

6 Claims, 3 Drawing Sheets

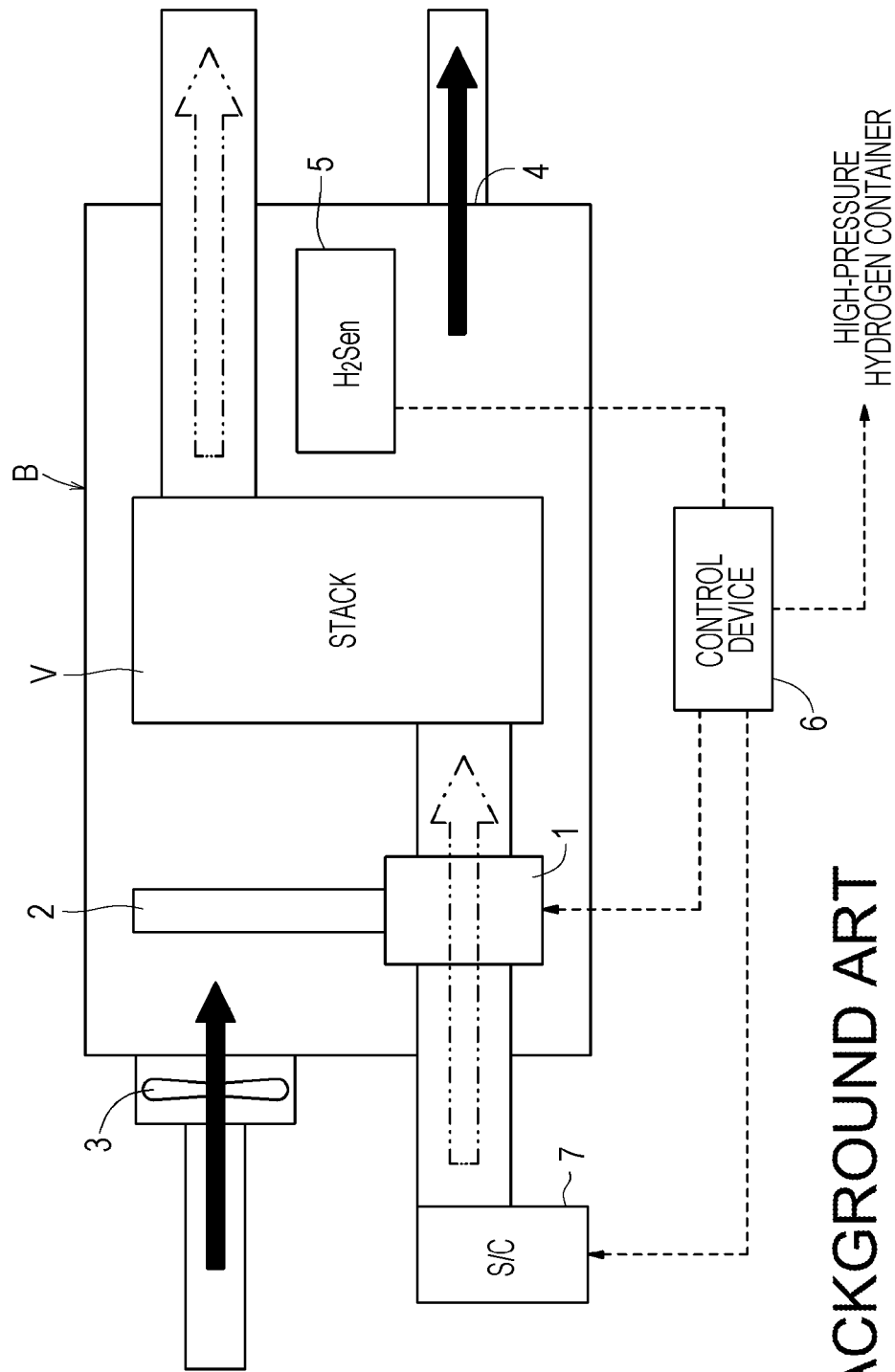

FUEL CELL SYSTEM HAVING FUEL CELL BOX AND VENTILATION DEVICE

CROSS-REFERENCE TO RELATED APPLICATIONS

The present application claims priority under 35 U.S.C. §119 to Japanese Patent Application No. 2011-169826, filed Aug. 3, 2011, entitled "Fuel Cell System." The contents of this application are incorporated herein by reference in their entirety.

BACKGROUND OF THE INVENTION

1. Field of the Invention

The present disclosure relates to a fuel cell system.

2. Discussion of the Background

For example, in a solid polymer electrolyte fuel cell, a membrane electrode assembly (MEA) is sandwiched between a pair of separators, the membrane electrode assembly including an electrolyte membrane formed of a polymer ion exchange membrane, and anode and cathode electrodes which are disposed on respective sides of the electrolyte membrane.

Normally, in the fuel cell, a fuel gas passage for supplying a fuel gas to the anode electrode is formed between one separator and the membrane electrode assembly, while an oxidant gas passage for supplying an oxidant gas to the cathode electrode is formed between the other separator and the membrane electrode assembly. In addition, between adjacent separators which constitute part of each fuel cell, there is formed a cooling medium passage for passing a cooling medium corresponding to the electrodes area.

A fuel cell of this type may be mounted particularly in a fuel cell electric vehicle with the fuel cell being disposed in a fuel cell box. In this case, a fuel cell compartment for storing the fuel cell is formed in the fuel cell box, and a ventilator for ventilating the fuel cell compartment is used. The ventilator has a function of, upon detecting incoming hydrogen from, e.g., a hydrogen line of the fuel cell, discharging the hydrogen to the outside of the fuel cell box with a ventilation fan.

In some cases, an in-vehicle fuel cell is installed in a fuel cell compartment within a limited space such as the under floor or the front box of a vehicle. Thus, similarly to the above-mentioned fuel cell box, the space in which a fuel cell is disposed, i.e., the fuel cell compartment needs to be ventilated.

For example, there is known a fuel cell box ventilator apparatus which is disclosed in Japanese Unexamined Patent Application Publication No. 2003-132916. As illustrated in FIG. 3, the fuel cell box ventilator includes a three-way valve 1, a gas outlet pipe 2, a ventilation fan 3, a discharge port 4, a hydrogen detection sensor 5, and a control device 6.

When hydrogen inside a fuel cell box B is detected by the hydrogen detection sensor 5, the three-way valve 1 discharges air into the fuel cell box B through the gas outlet pipe 2 in accordance with a detected value, the air being supplied to a fuel cell V from a supercharger 7.

SUMMARY OF THE INVENTION

According to one aspect of the present invention, an fuel cell system includes a fuel cell, a fuel cell box, a ventilation device, an air intake duct, and a gas outlet pipe. The fuel cell includes a power generation cell having a membrane electrode assembly. The membrane electrode assembly includes an electrolyte membrane, an anode electrode, and a cathode electrode. The anode electrode and the cathode electrode are respectively disposed on both sides of the electrolyte membrane. The fuel cell is configured to generate power through electrochemical reaction between an oxidant gas supplied to the cathode electrode and a fuel gas supplied to the anode electrode. The fuel cell is disposed in the fuel cell box. The ventilation device is provided to supply air to the fuel cell box. The air intake duct connects the ventilation device to the fuel cell box to supply air from the ventilation device into the fuel cell box. The gas outlet pipe is connected to the air intake duct and connects an inside space of the fuel cell box to an outside space of the fuel cell box through the air intake duct. The gas outlet pipe has an opening cross-sectional area smaller than an opening cross-sectional area of the air intake duct.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 is a schematic diagram of the fuel cell box ventilator disclosed in Japanese Unexamined Patent Application Publication No. 2003-132916.

DESCRIPTION OF THE EMBODIMENTS

Figure 1:
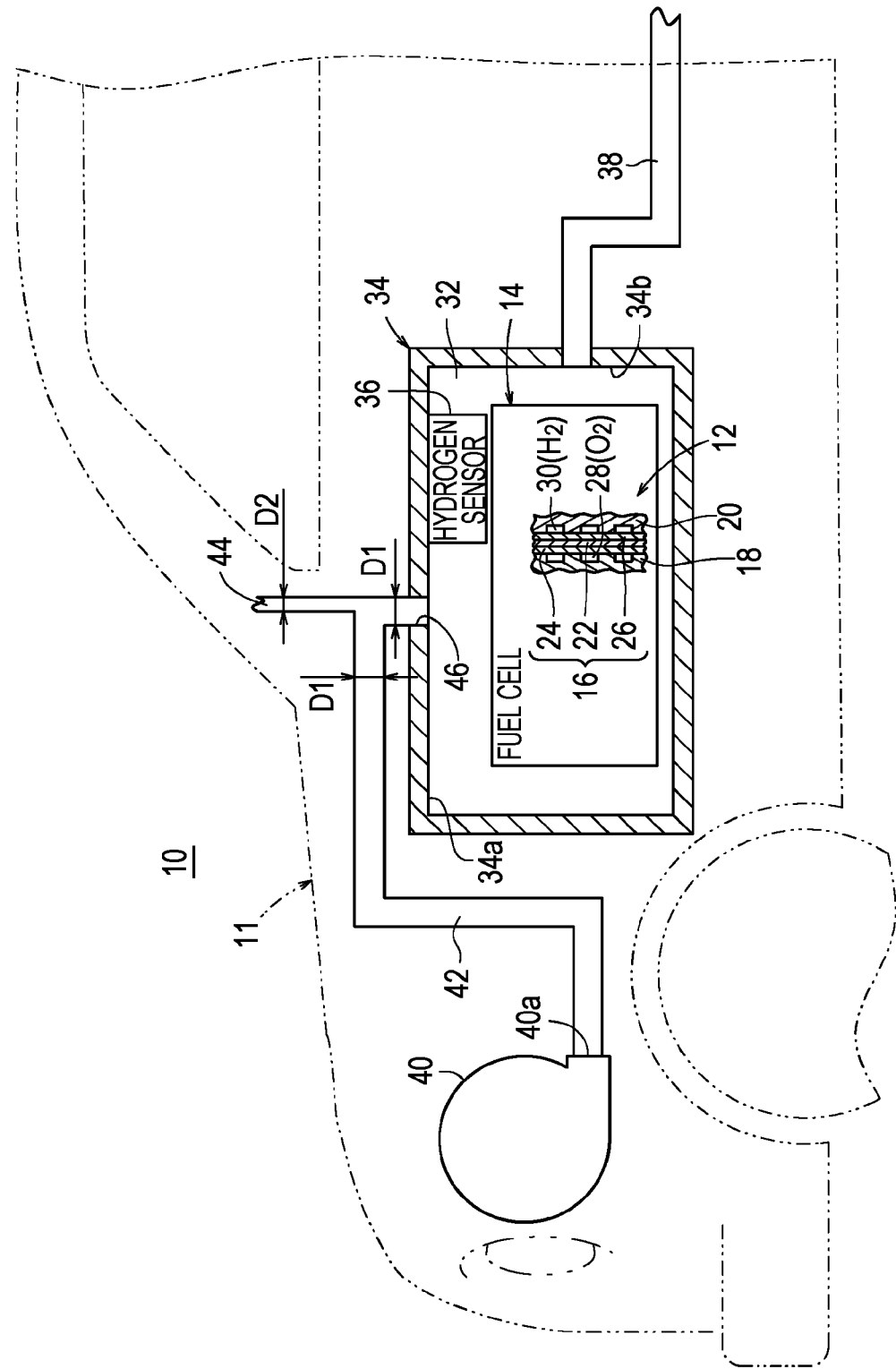
FIG. 1 is a schematic configuration diagram of a fuel cell vehicle equipped with a fuel cell system according to a first embodiment of the present disclosure.

The embodiments will now be described with reference to the accompanying drawings, wherein like reference numerals designate corresponding or identical elements throughout the various drawings.

As illustrated in FIG. 1, a fuel cell system 10 according to the first embodiment of the present disclosure constitutes, for example, an in-vehicle fuel cell system which is mounted in a fuel cell vehicle 11 such as a fuel cell electric vehicle.

The fuel cell system 10 includes a fuel cell 14 in which a plurality of power generation cells 12 are stacked in the horizontal direction or the gravitational direction. In the fuel cell 14, a membrane electrode assembly (MEA) 16 is sandwiched between a cathode-side separator 18 and an anode-side separator 20. The membrane electrode assembly 16 includes, for example, a solid polymer electrolyte membrane 22 which is a thin perfluoro sulfonic acid membrane impregnated with water, and a cathode electrode 24, and an anode electrode 26 between which the solid polymer electrolyte membrane 22 is sandwiched.

The cathode electrode 24, and the anode electrode 26 each have a gas diffusion layer which is formed of carbon paper or the like, and an electrode catalyst layer which is formed by uniformly coating the surface of the gas diffusion layer with porous carbon particles which carry platinum alloy on the surfaces thereof. The electrode catalyst layer is formed on both sides of the solid polymer electrolyte membrane 22.

An oxidant gas passage 28 is formed on the surface of the cathode-side separator 18, which faces the membrane electrode assembly 16. A fuel gas passage 30 is formed on the surface of the anode-side separator 20, which faces the membrane electrode assembly 16. A cooling medium passage (not illustrated) is formed between the cathode-side separator 18 and the anode-side separators 20 which are adjacent to each other.

Although not illustrated, an oxidant gas supply unit, a fuel gas supply unit, and a cooling medium supply unit are connected to the fuel cell 14, the oxidant gas supply unit being configured to supply an oxidant gas, e.g., air to the oxidant gas passage 28, the fuel gas supply unit being configured to supply a fuel gas, e.g., hydrogen gas to the fuel gas passage 30, and the cooling medium supply unit being configured to supply a cooling medium to the cooling medium passage.

The fuel cell 14 is disposed in the fuel cell compartment 32. The fuel cell compartment 32 is formed within a fuel cell box 34, for example. The fuel cell box 34 may store therein the fuel cell 14, a hydrogen detection sensor 36 for detecting hydrogen concentration, and auxiliary equipment of the fuel cell 14. The hydrogen detection sensor 36 is disposed on an inner upper surface (top plate) 34*a* of the fuel cell box 34. A box ventilation exhaust duct 38 is connected to the fuel cell box 34 at a lower portion of a wall surface 34*b*.

The fuel cell system 10 includes a ventilation device (for example, an air pump) 40 disposed outside of the fuel cell box 34; an air intake duct 42 which is connected to the ventilation device 40 and supplies ventilation air into the fuel cell box 34; and a gas outlet pipe 44 disposed at a portion of the air intake duct 42, the gas outlet pipe 44 having an opening cross-sectional area smaller than that of the air intake duct 42 and being provided above the fuel cell box 34 and open to the outside.

The air intake duct 42 has one end which communicates with an air outlet 40*a* of the ventilation device 40, and the other end which communicates with an upper opening 46 of the fuel cell box 34. The gas outlet pipe 44 extends above the fuel cell box 34, and has an opening. An inner diameter D1 of the air intake duct 42 is set to be larger than an inner diameter D2 of the gas outlet pipe 44 (D1>D2). It is preferable to have a relationship of $4 \times D2 \geq D1 \geq 1.5 \times D2$, and it is more preferable to have a relationship of $4 \times D2 \geq D1 \geq 2 \times D2$. Substantially, D1 and D2 are set as needed in accordance with desired values of natural ventilation capability and forced ventilation capability.

The operation of the fuel cell system 10 configured in this manner will be described below.

First, when the fuel cell vehicle 11 equipped with the fuel cell system 10 is in a normal driving state, the oxidant gas supply unit, the fuel gas supply unit, and the cooling medium supply unit are driven. Thus, an oxidant gas (air) is supplied to the oxidant gas passage 28 of the fuel cell 14, while a fuel gas (hydrogen gas) is supplied to the fuel gas passage 30 of the fuel cell 14.

Therefore, each of the power generation cells 12 generates power through electrochemical reaction between the oxygen in the oxidant gas which is supplied to the cathode electrode 24, and the hydrogen in the fuel gas which is supplied to the anode electrode 26. Accordingly, power is supplied from the fuel cell 14 to a drive motor (not illustrated), and thus the fuel cell vehicle 11 can drive. In addition, the fuel cell 14 is cooled by the cooling medium supplied thereto.

In the fuel cell box 34, the hydrogen detection sensor 36 detects whether or not the hydrogen concentration in the fuel cell compartment 32 is greater than or equal to a predetermined value. When a hydrogen concentration greater than or equal to the predetermined value is detected, the ventilation device 40 is driven. The air to the fuel cell 14 for power generation may be supplied through a branched duct.

Therefore, air is sent from the ventilation device 40 to the air intake duct 42, and is sent out through the upper opening 46 of the fuel cell box 34 into the fuel cell chamber 32. Consequently, hydrogen which has entered the fuel cell chamber 32 is discharged by the air to outside of the fuel cell chamber 32 through the box ventilation exhaust duct 38, and thus the inside of the fuel cell box 34 is ventilated.

In the above operation, the inner diameter D1 of the air intake duct 42 is set to be larger than the inner diameter D2 of the gas outlet pipe 44 (D1>D2). Therefore, the air which flows through the air intake duct 42 is favorably sent into the fuel cell box 34, and the fuel cell chamber 32 is ventilated, while preventing back flow of hydrogen from the gas outlet pipe 44 to the outside. Accordingly, in the fuel cell vehicle 11, it is possible to prevent hydrogen from entering a space where entry of hydrogen should be suppressed, for example, a motor compartment, a vehicle cabin, or the like.

When the fuel cell chamber 32 in the fuel cell box 34 has a very small hydrogen concentration (a hydrogen concentration less than a predetermined value), the ventilation device 40 is stopped. Thus, the fuel cell compartment 32 containing hydrogen is naturally ventilated to the outside of the fuel cell box 34 through the gas outlet pipe 44 which is provided in a portion of the air intake duct 42.

In particular, the gas outlet pipe 44 extends above the upper opening 46 of the fuel cell box 34, and has an opening. Therefore, hydrogen which tends to stay in an upper portion of the fuel cell box 34 is effectively discharged.

In this case, in the first embodiment, when the fuel cell chamber 32 has a hydrogen concentration less than a predetermined value, the ventilation device 40 is stopped, and thus the fuel cell compartment 32 containing a little hydrogen is naturally ventilated.

On the other hand, when a hydrogen concentration greater than or equal to the predetermined value is detected in the fuel cell compartment 32, the ventilation device 40 is driven so that ventilation air is introduced through the air intake duct 42 into the fuel cell compartment 32 which is forcibly ventilated.

Consequently, a valve or the like for switching between natural ventilation and forced ventilation is not necessary, and thus the ventilation device 40 can be driven cost-effectively with a simple configuration. Furthermore, there are obtained effects that the inside of the fuel cell box 34 can be favorably ventilated, and noise caused by the ventilation device 40 can be effectively reduced.

Figure 2:
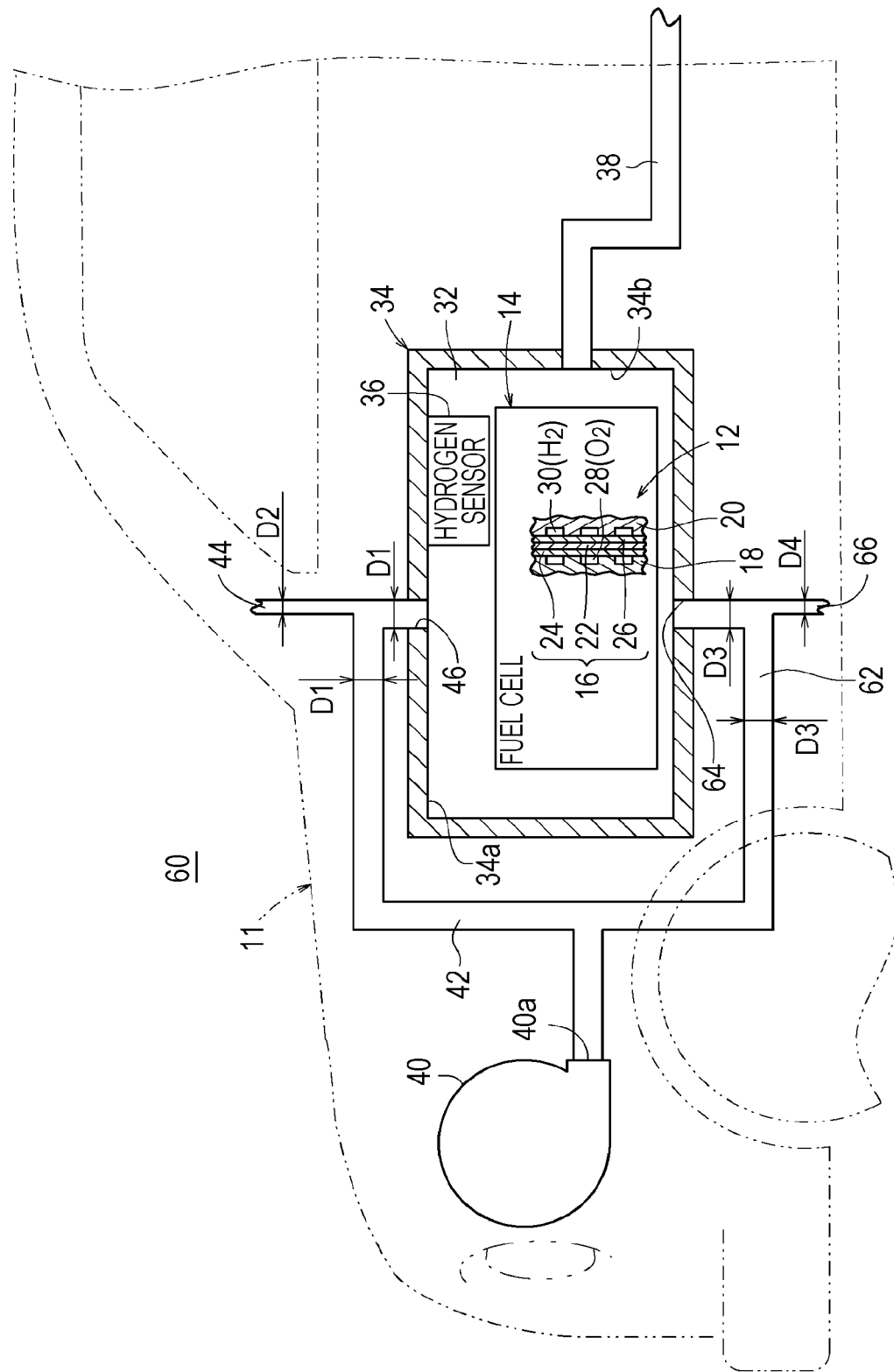
FIG. 2 is a schematic configuration diagram of a fuel cell vehicle equipped with a fuel cell system according to a second embodiment of the present disclosure.

FIG. 2 is a schematic configuration diagram of the fuel cell vehicle 11 equipped with a fuel cell system 60 according to the second embodiment of the present disclosure. The same components as those of the fuel cell system 10 according to the first embodiment are labeled with the same reference symbols, and detailed description thereof is omitted.

In the fuel cell system 60, a branch duct 62 is formed at some point along the air intake duct 42. The branch duct 62 communicates with a lower opening 64 of the fuel cell box 34 in the direction of gravity, and is provided with a drain pipe 66 which extends below the fuel cell box 34 and has an opening.

An inner diameter D3 of the branch duct 62 is set to be larger than an inner diameter D4 of the drain pipe 66 (D3>D4). It is preferable to have a relationship of $4 \times D4 \geq D3 \geq 1.5 \times D4$, and it is more preferable to have a relationship of $4 \times D4 \geq D3 \geq 2 \times D4$.

The operation of the fuel cell system 60 configured in this manner will be described below.

When the fuel cell chamber 32 has a hydrogen concentration less than a predetermined value, the ventilation device 40 is stopped, and the fuel cell compartment 32 containing hydrogen is naturally ventilated to the outside of the fuel cell box 34 through the gas outlet pipe 44 which is provided in a portion of the air intake duct 42.

Condensed water tends to stay at the bottom of the fuel cell compartment 32. The branch duct 62 is disposed so as to communicate with the lower opening 64 of the fuel cell box 34, and is provided with the drain pipe 66 which extends below the fuel cell box 34 and has an opening. Therefore, condensed water remaining at the bottom of the fuel cell chamber 32 is discharged from the branch duct 62 to the outside through the drain pipe 66. Consequently, water can be prevented from staying in the fuel cell compartment 32.

On the other hand, when a hydrogen concentration greater than or equal to the predetermined value is detected in the fuel cell compartment 32, the ventilation device 40 is driven so that ventilation air is introduced through the air intake duct 42 into the fuel cell compartment 32 which is forcibly ventilated.

Similarly, ventilation air is introduced into the fuel cell compartment 32 from the branch duct 62 which branches from the air intake duct 42. In the above operation, the inner diameter D3 of the branch duct 62 is set to be larger than the inner diameter D4 of the drain pipe 66 (D3>D4). Therefore, the air which flows through the branch duct 62 is favorably sent into the fuel cell box 34, and the fuel cell chamber 32 is ventilated, while preventing back flow of hydrogen from the drain pipe 66 to the outside.

Consequently, a valve or the like for switching between natural ventilation and forced ventilation is not necessary, and thus the ventilation device 40 can be driven cost-effectively with a simple configuration, thereby providing the same effect as that of the above-described first embodiment.

As discussed above, the fuel cell system according to the embodiment includes a power generation cell having a membrane electrode assembly in which an anode electrode and a cathode electrode are disposed on two sides of an electrolyte membrane; a fuel cell configured to generate power through electrochemical reaction between an oxidant gas supplied to the cathode electrode and a fuel gas supplied to the anode electrode; and a fuel cell box in which the fuel cell is disposed.

The fuel cell system includes a ventilation device; an air intake duct which is connected to the ventilation device and supplies air into the fuel cell box; and a gas outlet pipe disposed at a portion of the air intake duct, the gas outlet pipe having an opening cross-sectional area smaller than that of the air intake duct, and being open to outside of the fuel cell box. In the present disclosure, when the hydrogen concentration in the fuel cell compartment is less than a predetermined value, the ventilation device is stopped. Thus, the hydrogen in the fuel cell compartment is naturally ventilated to the outside of the fuel cell box through a gas outlet pipe which is provided in a portion of an air intake duct. On the other hand, when a hydrogen concentration greater than or equal to the predetermined value is detected in the fuel cell compartment, the ventilation device is driven. Thus, ventilation air is introduced through the air intake duct into the fuel cell compartment which is forcibly ventilated. In the above operation, the gas outlet pipe has an opening cross-sectional area smaller than that of the air intake duct, and thus back flow of hydrogen from the gas outlet pipe to the outside can be prevented. Consequently, a valve or the like for switching between natural ventilation and forced ventilation is not necessary, and thus the ventilation device can be driven cost-effectively with a simple configuration, and the inside of the fuel cell box can be favorably ventilated. Furthermore, noise caused by the ventilation device can be effectively reduced.

In the fuel cell system, it is preferable that the air intake duct communicate with an upper portion of the fuel cell box, and the gas outlet pipe extend above the fuel cell box and has an opening.

In the fuel cell system, it is preferable that a branch duct be formed at some point along the air intake duct such that the branch duct communicates with a lower portion of the fuel cell box and is provided with a drain pipe which extends below the fuel cell box and has an opening having an opening cross-sectional area smaller than that of the branch duct.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system comprising:
   a fuel cell including a power generation cell having a membrane electrode assembly comprising:
      an electrolyte membrane;
      an anode electrode; and
      a cathode electrode, the anode electrode and the cathode electrode being respectively disposed on both sides of the electrolyte membrane, the fuel cell being configured to generate power through electrochemical reaction between an oxidant gas supplied to the cathode electrode and a fuel gas supplied to the anode electrode;
   a fuel cell box in which the fuel cell is disposed;
   a ventilation device to supply air to the fuel cell box;
   an air intake duct connecting the ventilation device to the fuel cell box to supply air from the ventilation device into the fuel cell box; and
   a gas outlet pipe having a first end connected to the air intake duct and a second end that is unconnected and has an opening that is open to an outside space, the gas outlet pipe connecting an inside space of the fuel cell box to the outside space of the fuel cell box through the air intake duct, the gas outlet pipe having an opening cross-sectional area smaller than an opening cross-sectional area of the air intake duct.

2. The fuel cell system according to claim 1,
   wherein the air intake duct communicates with an upper portion of the fuel cell box, and the gas outlet pipe extends above the fuel cell box.

3. The fuel cell system according to claim 1, further comprising:
   a branch duct connecting the air intake duct to the fuel cell box and communicating with a lower portion of the fuel cell box; and
   a drain pipe connected to the branch duct and extending below the fuel cell box, the drain pipe having an opening cross-sectional area smaller than an opening cross-sectional area of the branch duct.

4. The fuel cell system according to claim 3,
   wherein the branch duct includes a first end portion and a second end portion, the first end portion being connected to the air intake duct, the second end portion being connected to a lower portion of the fuel cell box and downwardly extending from the lower portion of the fuel cell box, and
   wherein the drain pipe is connected to the second end portion of the branch duct and downwardly extends from the second end portion of the branch duct.

5. The fuel cell system according to claim 1, further comprising:
   an exhaust duct connected to the fuel cell box at a position lower than a position at which the air intake duct is connected to the fuel cell box, the exhaust duct connecting an inside space of the fuel cell box to an outside space of the fuel cell box.

6. The fuel cell system according to claim 1,
wherein the air intake duct includes a first end portion and a second end portion, the first end portion being connected to the ventilation device, the second end portion being connected to an upper portion of the fuel cell box and upwardly extending from the upper portion of the fuel cell box, and
wherein the gas outlet pipe is connected to the second end portion of the air intake duct and upwardly extends from the second end portion of the air intake duct.

* * * * *